UNITED STATES PATENT OFFICE.

JOSEPH D. McDANIEL, OF CHICAGO, ILLINOIS.

ART OF IMITATING ONYX, &c.

SPECIFICATION forming part of Letters Patent No. 587,284, dated July 27, 1897.

Application filed August 26, 1896. Serial No. 604,016. (No specimens.)

*To all whom it may concern:*

Be it known that I, JOSEPH D. MCDANIEL, a citizen of the United States, residing at Chicago, county of Cook, State of Illinois, have invented a certain new and useful Improvement in the Art of Imitating Onyx, Granite, Marble, or Wood for Interior Decoration and Ornamental Signs; and I do hereby declare that the following is a full, clear, and exact description of my invention, which will enable others skilled in the art to which it appertains to make and use the same.

Heretofore onyx, granite, and marble have been imitated on glass by use of various colored pigments mixed with oil or varnishes and applied to the surfaces of glass, and with the aid of brushes and sponges in the hands of an artist worked in the various forms or designs required, then when dry backed up with a hard coat of paint.

To carry my invention into operation, procure a sheet of glass or other transparent substance the required size and shape, and thoroughly clean its surface bright and glossy, then apply to the surface of the glass with a brush a light coat of balsam of fir. The glass thus prepared is then set aside for ten or twelve hours, or until the balsam hardens sufficiently to allow the pigments to be spread upon the balsam-surface. Then lay on the various colored paints, mixed in oil, that are necessary to produce the designs, shadings, or forms of onyx, granite, marble, or wood, just as the workman may fancy or his skill suggest. This being done, procure common spirits of turpentine or benzene, (I prefer spirits of turpentine,) and with a stiff brush dipped into the turpentine spatter or sprinkle the surface of the pigments in a careless manner. The drops of turpentine will vary in size as they fall from the brush. The spirits of turpentine having a greater chemical affinity for the balsam will sink through the paints, and as soon as it comes in contact with the balsam it instantly spreads under the colors into an inconceivable number of shapes and forms. As soon as it has done this it dissolves the colors that are suspended in oils, and they settle into the balsam, assuming the various attractive figures seen in the stone in process of imitation. At this stage lay the work aside and allow it to thoroughly dry. When it is dry, apply a backing or ground color of the shade required. When it is dry, the glass may be turned over and the reverse side cleaned, and there will be seen the nearest imitation of highly-polished onyx, granite, or marble possible to make with the present state of art. The glass having been decorated may now be fixed to metal or other suitable frames, or set in cement when used as wainscoting.

Having fully described my invention, what I desire to claim and secure by Letters Patent is—

The process of treating glass to produce an imitation of marble, onyx, &c., which consists in coating the glass with a solution of balsam of fir allowing the same to become dry; then applying a suitable color to said coating and before said color has become dry sprinkling the prepared surface with spirits of turpentine, whereby the turpentine dissolves the color and balsam in various spots and causes the said colors to sink into the balsam of fir, thus producing a variegated aspect; and finally in providing the surface treated with a suitable backing or ground color, substantially as described.

JOSEPH D. McDANIEL.

Witnesses:
LEWIS REESE,
C. C. BISHOP.